United States Patent

Kühnlein

[11] 4,105,940
[45] Aug. 8, 1978

[54] POSITION CONTROL DEVICE

[75] Inventor: Hans Kühnlein, Nürnberg-Grossgründlach, Fed. Rep. of Germany

[73] Assignee: Siemens Aktiengesellschaft, Munich, Fed. Rep. of Germany

[21] Appl. No.: 742,703

[22] Filed: Nov. 17, 1976

[30] Foreign Application Priority Data

Nov. 26, 1975 [DE] Fed. Rep. of Germany ....... 2553119

[51] Int. Cl.² .............................................. G05B 1/06
[52] U.S. Cl. .................................. 318/653; 318/327; 324/173; 318/254
[58] Field of Search ............... 318/254, 616, 653, 326, 318/327, 328; 324/173, 174

[56] References Cited

U.S. PATENT DOCUMENTS

| 3,501,664 | 3/1970 | Veillette | 324/173 X |
| 3,512,060 | 5/1970 | Floyd | 318/616 X |
| 3,663,877 | 5/1972 | Clark | 318/326 X |
| 3,766,458 | 10/1973 | Nishimura et al. | 318/254 X |
| 3,889,169 | 6/1975 | Hirscham et al. | 318/618 X |

Primary Examiner—B. Dobeck
Attorney, Agent, or Firm—Kenyon & Kenyon, Reilly, Carr & Chapin

[57] ABSTRACT

In a position control device for driving a speed controlled motor, the motor having coupled thereto a tachometer generator for providing velocity feedback, a brushless tachometer generator having at least one position transmitter for the rotor thereof is used as the tachometer generator and the position signals of the position transmitter also used to provide an actual value feedback for the position control.

2 Claims, 3 Drawing Figures

POSITION CONTROL DEVICE

BACKGROUND OF THE INVENTION

This invention relates to position control devices for positioning speed controllable motors in general and more particularly to an improved device of this nature in which a brushless tachometer generator is utilized to furnish both velocity and position feedback information.

Position control devices for controlling speed controllable motors are known in the art. Typically, such devices include means such as a potentiometer to set in a desired position, a position controller having as inputs the desired value set on the potentiometer and an actual value from a feedback device coupled to the motor, a speed or velocity controller having as inputs the output of the position controller and velocity feedback from a tachometer generator, along with a current controller, having as an input the output of the velocity controller, which supplies the current to the motor to cause it to be driven to the proper position at a controlled velocity. In such devices, there is a need for position feedback such as from a potentiometer which is mechanically coupled to the shaft of the motor along with the tachometer generator which provides velocity feedback.

SUMMARY OF THE INVENTION

It is the object of the present invention to provide an improved position control device of the general nature described above which utilizes a reduced number of components.

According to the present invention such is achieved by using as the tachometer generator for the position control device a brushless tachometer generator which includes at least one position transmitter for the rotor of the tachometer generator and by using the position signals from this position transmitter as the actual value for the position control. By using a brushless tachometer generator, a DC voltage proportional to the actual speed is directly available to be fed back as the actual speed value. As a result, a subsequent rectification of the speed proportional tachometer generator voltage is unnecessary. The position signals of the position transmitter which are required in a brushless tachometer generator, in addition to controlling the commutation of the tachometer generator, are also used as the actual value feedback for the position control. As a result, a separate position feedback device is no longer necessary. Thus, through these measures the amount of hardware required is substantially reduced.

As disclosed, it is preferred that the position transmitter be a Hall effect generator, the Hall voltage of which acts as the actual value for the position control. In some applications the fact that the number of position signals delivered during one revolution of the rotor of the tachometer generator is fixed by the number of poles of the tachometer generator rotor may be objectionable. Thus, in accordance with another embodiment of the present invention, the number of position signals delivered is made independent of the number of poles of the tachometer generator rotor by providing at the rotor of the tachometer generator a separate magnetic track with an alternating sequence of north and south poles. Associated with this magnetic track is an additional Hall effect generator for determining the actual value of the position control.

DETAILED DESCRIPTION OF THE PREFERRED EMBODIMENT

Figure 1:
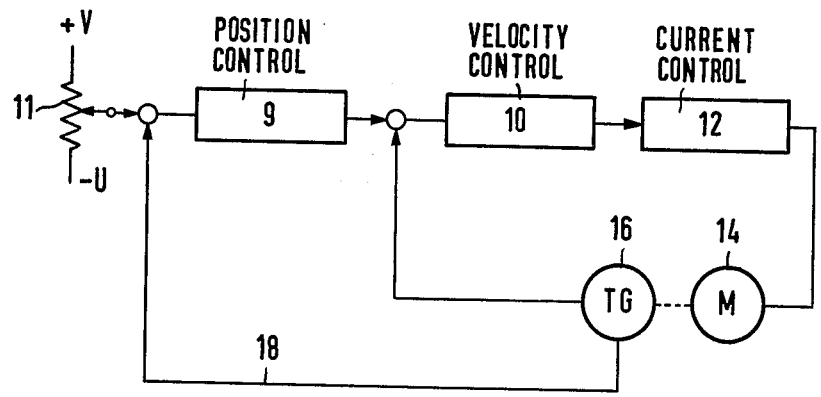
FIG. 1 is a block diagram of the position control system of the present invention.

FIG. 1 illustrates in block diagram form the system of the present invention. As indicated above, the position control device of the present invention is used to control a speed controllable motor. The motor 14 has coupled to its shaft a tachometer generator 16. A desired position is set in on a potentiometer 11 where it is summed with position feedback on line 18 to provide an input to a position control 9 which may be a conventional integral controller. The output of the tachometer generator 16 to provide the input to a velocity controller, which may also be a conventional integral controller, the output of which provides the input to a current controller 12 which supplies the necessary current to the motor 14 to cause it to drive to the desired position at a controlled speed. With the exception of the tachometer generator 16, this is a conventional system. In a conventional systems, however, there would be an additional feedback device also coupled to the motor shaft. However, in accordance with the present invention by utilizing a brushless tachometer generator, position feedback is obtained on line 18 from the tachometer generator.

Figure 2:
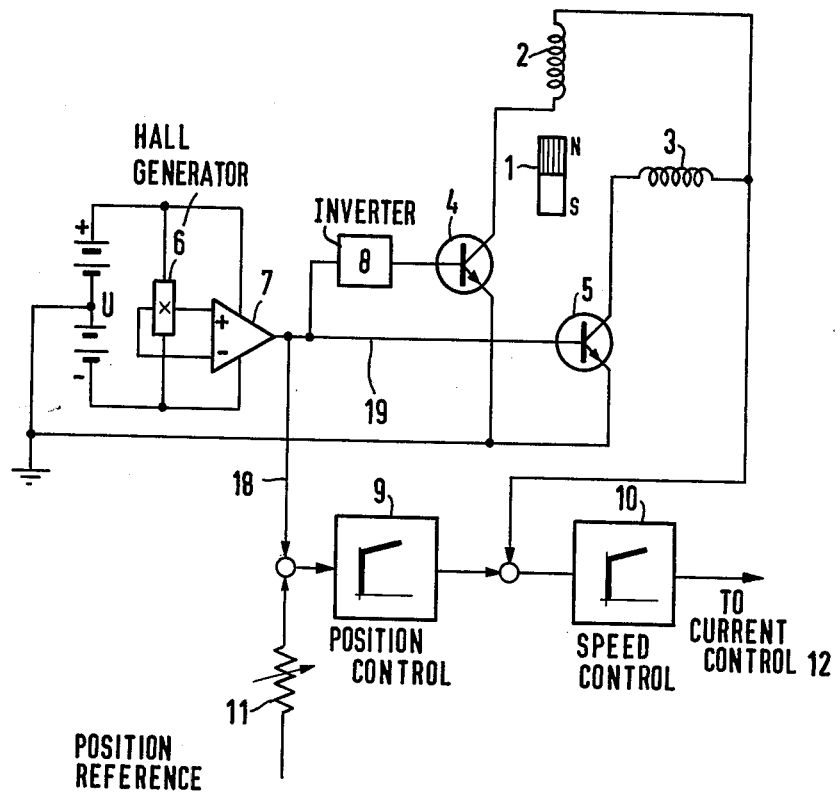
FIG. 2 is a schematic diagram of a first embodiment of the tachometer generator of the present invention.

The tachometer generator itself is illustrated on FIG. 2. The tachometer generator has a permanent magnet rotor 1 which interacts with field windings 2 and 3. The field windings are switched by means of transistors 4 and 5. Also associated with the rotor 1 is a Hall generator 6 which acts as a position transmitter and is used to control the transistors 4 and 5. The Hall effect generator in conventional fashion is disposed so that it is influenced by the magnetic field of the rotor 1. The outputs of the Hall generator 6 are inputs to a Hall amplifier 7. Voltage is supplied to the Hall generator and the amplifier 7 by means of a DC voltage source U having a center tap which is tied to the ground. The output of the amplifier 7 is coupled directly on line 19 to the base of transistor 5 and through an inverter 8 to the base of transistor 4. Thus, as the rotor 1 rotates, the power transistors 4 and 5 are alternatingly driven into conduction and cut off. In addition, the output of the Hall amplifier 7, which will be a voltage proportional to position, is fed to a summing junction as the input of the position controller 9 having as its other input the desired position value from the position reference potentiometer 11. As described above, the output of the position controller 9 is coupled through a summing junction to the speed controller 10. At the summing junction the output of position controller 9 is summed with the output obtained from the field windings 2 and 3, which output will be proportional to the motor speed. The output of the speed controller is then provided to the current controller 12.

Thus, in the position control device just described, the tachometer generator, which is necessary in any case, also furnishes the actual value for the positioning control along with providing velocity feedback. Thus, a separate transmitter for determining the actual position is no longer necessary.

Figure 3:
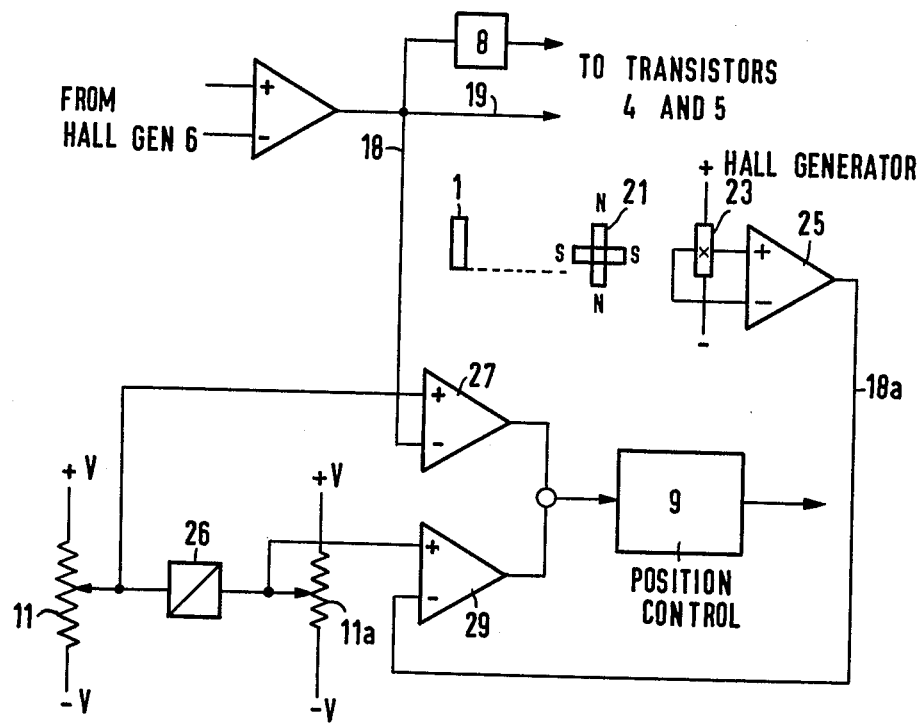
FIG. 3 is a circuit diagram illustrating a further embodiment of the present invention.

FIG. 3 illustrates a modification of the arrangement of FIG. 2 for use in cases where a large number of position signals per revolution is necessary to obtain high accuracy. If such cannot be obtained with the number of poles in the rotor 1 of the tachometer generator, an additional magnetic track 21 is provided having the required number of alternating north and south poles. Associated therewith is an additional Hall generator 23 and Hall amplifier 25.

Since, with a number of poles such as poles 21 there will be a number of positions where the same voltage output is present, the output on line 18 is still required to give a coarse position input with the output on line 18a from the amplifier 25 used to give a fine position. Thus, associated with the potentiometer 11 coupled through gearing 26 is a second potentiometer 11a e.g. a multiturn potentiometer. The output of potentiometer 11 is summed with the output on line 18 in a summing amplifier 27. The output from the potentiometer 11a is summed with the output on line 18 in a summing amplifier 29. The two amplifier output signals are summed together at the input of the position control 9. As is conventional is a two speed systems such as this, the gain of the two amplifiers 27 and 29 will be adjusted so that, as the desired position is neared, the amplifier 29 will become effective to carry out the final positioning. In addition or as an alternative, the output of amplifier 27 can be limited to that it only appears when a predetermined error exists at its input thereby permitting fine control by means of the amplifier 29 to become effective whenever near the desired position. Such limiting can be accomplished in conventional fashion through the use of diodes, for example.

What is claimed is:

1. In a position control device driving a speed controlled motor with a tachometer generator coupled to the motor providing velocity feedback information for speed control, the drive system including a position controller having as inputs a desired position voltage and an actual position feedback voltage, and a speed controller at the input of which the position controller output is summed with the feedback velocity, the improvement comprising the tachometer generator being a brushless tachometer generator generating a dc voltage proportional to the actual speed and having at least one position transmitter in the form of a Hall effect generator associated with its rotor, the Hall voltage obtained in said position transmitter being coupled to the position controller as the position feedback to indicate the actual value of position.

2. The improvement according to claim 1 and further including a separate magnetic track with an alternating sequence of north and south poles associated with the rotor of said tachometer generator and an additional Hall generator associated therewith, the output of said additional Hall generator being provided as an actual value position input for said position controller.

* * * * *